Oct. 24, 1972  H. P. DAVIS  3,700,543
SAFETY WINDSHIELD AND METHOD OF MAKING SAME
Filed Nov. 12, 1970

INVENTOR
HARRY P. DAVIS

BY
ATTORNEYS

United States Patent Office 3,700,543
Patented Oct. 24, 1972

3,700,543
SAFETY WINDSHIELD AND METHOD
OF MAKING SAME
Harry P. Davis, Tarentum, Pa. assignor to
PPG Industries, Inc., Pittsburgh, Pa.
Filed Nov. 12, 1970, Ser. No. 88,580
Int. Cl. B32b 17/10
U.S. Cl. 161—165
6 Claims

ABSTRACT OF THE DISCLOSURE

In making safety windshields from float glass, a blank cut WLW is paired with a blank cut WSW, the usual plastic interlayer being provided. This technique improves quality or yield and is of particular usefulness in making windshields from extra-thin float glass. Windshields made in this manner have distortion lines in one glass sheet oriented perpendicularly with respect to distortion lines in a second glass sheet.

BACKGROUND OF THE INVENTION (1) Field of the invention

This invention relates to safety windshields and to a method of making the same from float glass.

(2) Description of the prior art

It is, of course, old to make safety windshields by laminating a first ply of flat glass, a plastic interlayer, and a second ply of flat glass. Before about 1960, the plies of flat glass used in this process were almost invariably of ground and polished plate glass, which inherently has excellent freedom from distortion. More recently, it has been customary to use float glass about ⅛-inch thick for the first and second plies of flat glass. The float glass is produced by a process such as that described in U.S. Patent No. 3,083,551. Such float glass makes eminently satisfactory windshields, but since its quality as respects freedom from distortion is somewhat lower than that of ground and polished plate glass, windshields made therefrom must sometimes be rejected, especially if the design for the intended product calls for having one of the plies of glass to be thinner than usual (about 3 millimeters) or if the design is for a windshield that is to be installed in an automobile at a relatively low angle with respect to the horizontal, such as 35° or less. In some automobiles manufactured in the United States, this angle is as low as 31°.

Two trends are operating that tend to make it difficult to supply satisfactory safety windshields made from float glass. One is the trend, for styling reasons, toward the use of the lower installation angles mentioned above, i.e., 35° and lower. The other is the consideration that for safety purposes, it is considered desirable to produce a windshield having an inner ply that is of reduced thickness, such as 2.5 millimeters or less. In the float process, the glass is attenuated and the attenuation tends to cause distortion; since the thinner float glass must be attenuated more greatly, it tends to exhibit more distortion.

There are two different ways of cutting windshield blanks from a ribbon of plate or float glass, namely, WLW and WSW. A windshield blank is generally oblong, having dimensions such as about 1 meter by 1.8 meters. In WLW, the length of the oblong corresponds with the length of the ribbon; in WSW, the length of the oblong is transverse to the length of the ribbon. Both kinds of cutting have been done and the products eventually used to make windshields, but the WLW cutting is somewhat more usual. So far as I am aware, it has been the practice, before the present invention, to use for the making of a windshield, a pair of plies that have both been cut the same way, WLW or WSW. This has been true chiefly because it makes the manufacturing operation somewhat more convenient and less complex; however, those skilled in the art, accustomed to known practices, have also had misgivings about the results on the quality of the finished product, if the present practices are departed from in the manner herein proposed.

SUMMARY OF THE INVENTION

In making safety windshields from float glass, a blank cut WLW is paired with a blank cut WSW, the usual plastic interlayer being provided. This technique improves quality or yield, and it is of particular usefulness in making windshields from extra-thin float glass.

DESCRIPTION OF THE DRAWINGS

A complete understanding of the instant invention may be obtained from the foregoing and following description thereof, taken together with the appended drawings, in which.

DESCRIPTION OF THE PREFERRED EMBODIMENTS

Figure 1:
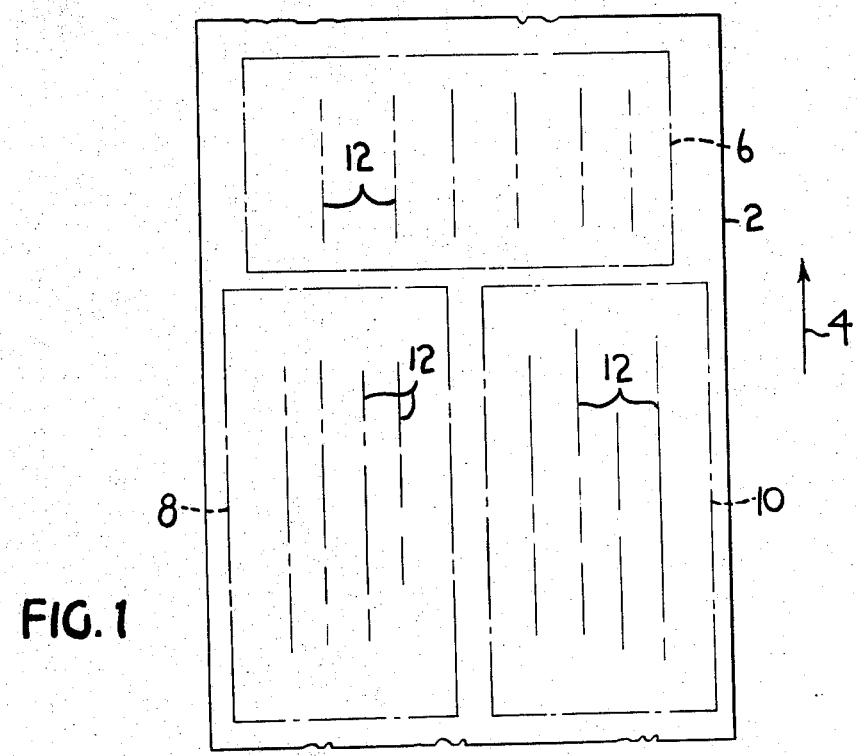
FIG. 1 is a schematic representation of a ribbon of float glass, indicating how certain windshield blanks may be cut therefrom.

Referring to FIG. 1, there is indicated a float-glass ribbon 2, the length of which extends parallel to the arrow 4. There is indicated at 6 a windshield blank cut WSW from the ribbon 2. Blanks 8 and 10 are cut from the ribbon 2 WLW. On the blanks 6, 8, and 10 there are indicated lines 12 that correspond to lines of distortion, usually barely visible, that are almost invariably present in float glass.

The float glass ribbon 2 has a thickness such as about 1.5 to 3 millimeters. Usually the lines 12 are more distinct and troublesome if the glass is thinner. The invention is of particular usefulness with float glass 1.5 to 2.2 millimeters thick, and especially when such glass is to be used for the manufacture of automotive windshields having an installation angle of about 35° from the horizontal or less.

Figure 2:
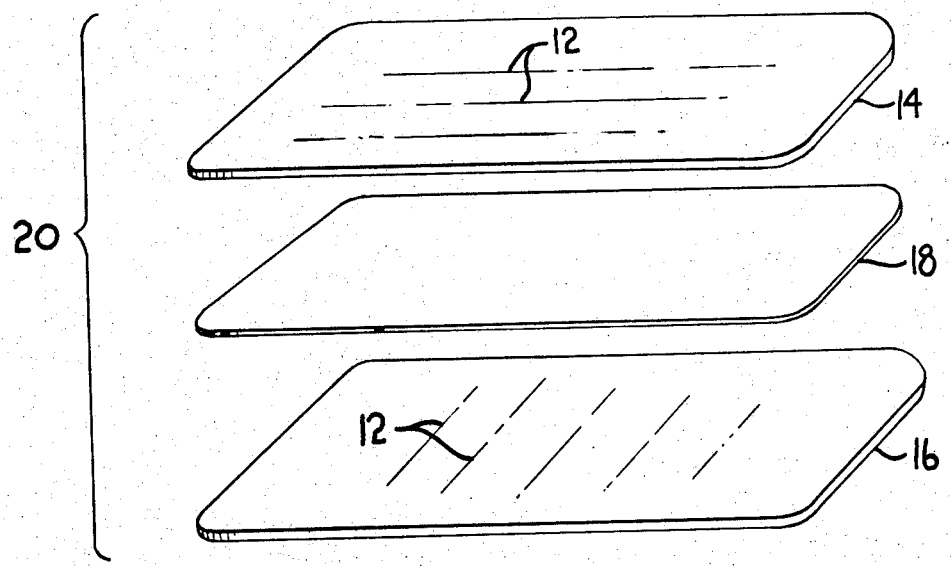
FIG. 2 is an exploded view of the plies used in the making of a safety windshield in accordance with the present invention.

The cutting of the blanks from the float glass ribbon may be accomplished conveniently and effectively in accordance with practices, and with the use of equipment, already known per se. After the blanks are cut, it is customary to cut from the blanks pieces of suitable shape, using a pattern cutter. After the cutting of such shaped pieces and any desired or necessary edging, beveling or inspecting thereof, there are obtained plies 14 and 16 (seen in FIG. 2) that may be made, for example, from the blanks 8 and 6, respectively. There is also produced, in known manner, a plastic interlayer piece 18 of suitable shape, and as indicated by the brackets 20, these are to be assembled by the customary laminating procedure to produce a windshield. Heating and bending steps are performed in a conventional manner.

It is not to be taken from the foregoing that in the manufacture of a commercial windshield, the plies 14 and 16 are necessarily to be taken from the same ribbon of float glass, or are to be of the same thickness. It is quite possible, and indeed in most instances it will be desirable, to produce a windshield having an outer ply of thicker glass and an inner ply of thinner glass. What is important, in accordance with the invention, is that the pieces or plies that are assembled are such that the distortion lines 12 of one ply are oriented substantially normal with respect to the distortion lines 12 of the other plies forming the windshield when it is assembled. It is conceivable that this criterion can be met by cutting blanks from a float-glass ribbon in a manner that is neither WLW or WSW, but rather angularly. Such a cutting method is difficult to implement and is wasteful of glass, but in principle, the instant invention is not strictly limited to the making of windshields from float glass wherein one of the blanks is cut WSW and the other WLW. All that is required is that the distortion lines that parallel the length of the ribbon from which the blanks are cut be, as indicated above, normal to each other, or substantially so, in the assembled laminated windsheild. In this regard, a minor deviation from absolute perpendicularity is surely tolerable; indeed, the improved results of the instant invention are obtained so long as the lines 12 are within about 20° of perpendicularity.

In one example of the practice of the instant invention, windshields were made by pairing plies cut WLW from float-glass ribbons of 3/32-inch nominal thickness with plies cut WSW from float-glass ribbon stock 1/8-inch thick, with the interlayer being of polyvinyl butyral 0.030-inch thick. Windshields of satisfactory commercial quality for installation at an angle of about 35° were thus obtained. In contrast, when the same blanks from float-glass ribbon stock 3/32-inch thick were paired with plies cut WLW from 1/8-inch float-glass ribbon stock, the resultant windshields were not of a quality high enough to meet commercial standards for the use indicated above.

The invention may be used either to improve the quality of windshields made from float-glass good enough that, even without the WLW-WSW pairing of the instant invention, adequate quality is obtained. The invention can also be used to widen the range of applicability, i.e., in the direction of lower installation angles, starting with float glass on a given level of quality.

In a broader aspect, the invention is not strictly limited to the manufacture of windshields. The invention will find applicability in the production of other articles made of laminated pieces of float glass, where a high level of quality with respect to freedom from distortion is important. For example, the invention may be used in making doors or windows of laminated safety glass.

I claim:
1. A laminated flat-glass product comprising a first ply of float glass, a second ply of float glass, and a ply of resinous interlayer material therebetween, said first and second plies of float glass having therein distortion lines, and the distortion lines in said first ply being oriented in said laminated product substantially perpendicularly, with respect to the distortion lines in said second ply.

2. A flat-glass product as defined in claim 1, characterized in that said flat-glass product is an automotive windshield.

3. A windshield as defined in claim 2, characterized in that said first ply is made of float glass 1.5 to 2.2 millimeters thick.

4. A method of making a laminated flat-glass product, said method comprising the steps of laminating together a first ply of float glass, a second ply of float glass, and a ply of resinous interlayer material therebetween, said first and second plies of float glass having therein distortion lines, and the distortion lines in said first ply being oriented in said laminated product substantially perpendicularly, with respect to the distortion lines in said second ply.

5. A method as defined in claim 5, characterized in that a product of said method is an automotive windshield.

6. A method as defined in claim 6, characterized in that said first ply has a thickness of 1.5 to 2.2 millimeters.

References Cited
UNITED STATES PATENTS

| | | | |
|---|---|---|---|
| 3,282,772 | 11/1966 | Davis, Sr. | 161—199 |
| 3,453,161 | 7/1969 | Golightly | 161—199 |
| 2,946,711 | 7/1960 | Bragaw Jr. | 161—199 |

ROBERT F. BURNETT, Primary Examiner

D. J. FRITSCH, Assistant Examiner

U.S. Cl. X.R.

156—101, 106; 161—199

UNITED STATES PATENT OFFICE
CERTIFICATE OF CORRECTION

Patent No. 3,700,543  Dated October 24, 1972

Inventor(s) Harry P. Davis

It is certified that error appears in the above-identified patent and that said Letters Patent are hereby corrected as shown below:

Column 4, Claim 4, line 16, the word "steps" should be --step--.

Column 4, Claim 5, line 23, the phrase "claim 5" should be --claim 4--.

Column 4, Claim 6, line 26, the phrase "claim 6" should be --claim 5--.

Signed and sealed this 29th day of May 1973.

(SEAL)
Attest:

EDWARD M. FLETCHER, JR.
Attesting Officer

ROBERT GOTTSCHALK
Commissioner of Patents